July 4, 1933.  W. H. BARBER  1,917,085
SEED DISTRIBUTOR
Filed March 24, 1931  2 Sheets-Sheet 1

W. H. Barber
INVENTOR
By Marks & Clerk
ATT'YS

July 4, 1933. W. H. BARBER 1,917,085
SEED DISTRIBUTOR
Filed March 24, 1931 2 Sheets-Sheet 2
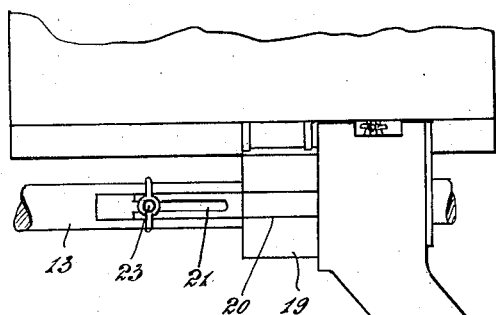
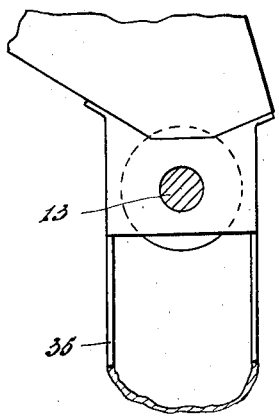
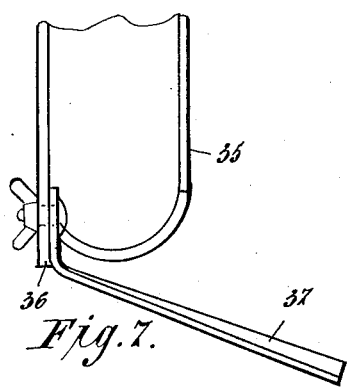
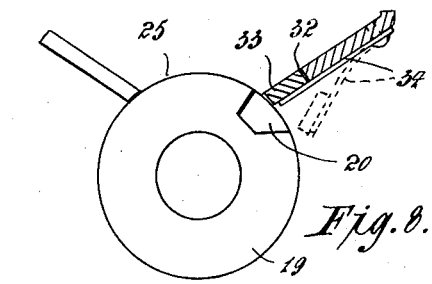
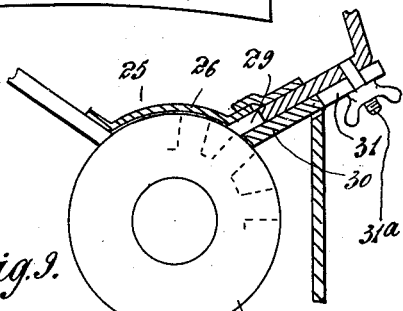
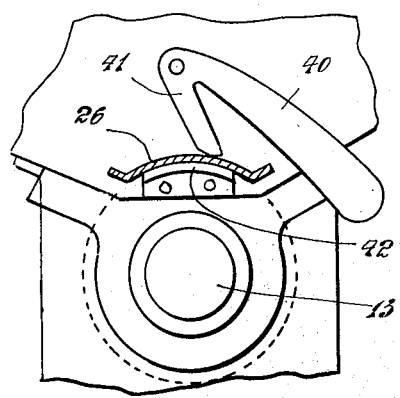
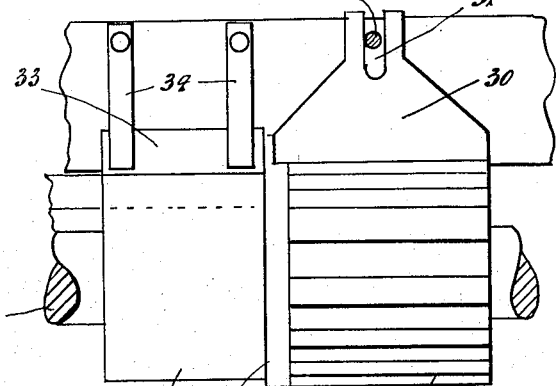

Patented July 4, 1933

1,917,085

UNITED STATES PATENT OFFICE

WILLIAM HENRY BARBER, OF ONGARUE, NEW ZEALAND

SEED DISTRIBUTOR

Application filed March 24, 1931, Serial No. 524,973, and in New Zealand April 28, 1930.

This invention relates to seed and the like distributors for attachment to ploughs and the like.

The object of the present invention is to enable the seed to be sown or distributed at the same time as the ploughing and covered to the required depth so that the ground is prepared and the seed sown in the one operation.

According hereto, the device comprises a seed box pivoted upon a transverse bar attached to the plough and having a seed distributing means at its lower end adapted to be actuated by an axle having a pinion upon the exterior of the box adapted to mesh with an internally toothed ring upon a driving wheel running upon the ground and rotatably mounted from the vertical portion of the bar upon which the seed box is pivoted. This pinion meshes with the ring by means of the seed box being pivoted at one side so that it will swing and cause the pinion normally to bear against the toothed rim.

The invention will be described with the aid of the accompanying drawings, wherein:—

Figure 1 is a rear elevation, and

Figure 2 a side view of the device in position on a plough.

Figure 5 is a side view showing the seed chute and spreader.

Figure 6 is an end view of the seed chute.

Figure 7 is an end view showing the spreader attached to the seed chute.

Figures 8 and 9 are detail views, in connection with the distributor rollers.

Figures 10 and 11 are further views of details.

Figures 1, 2:
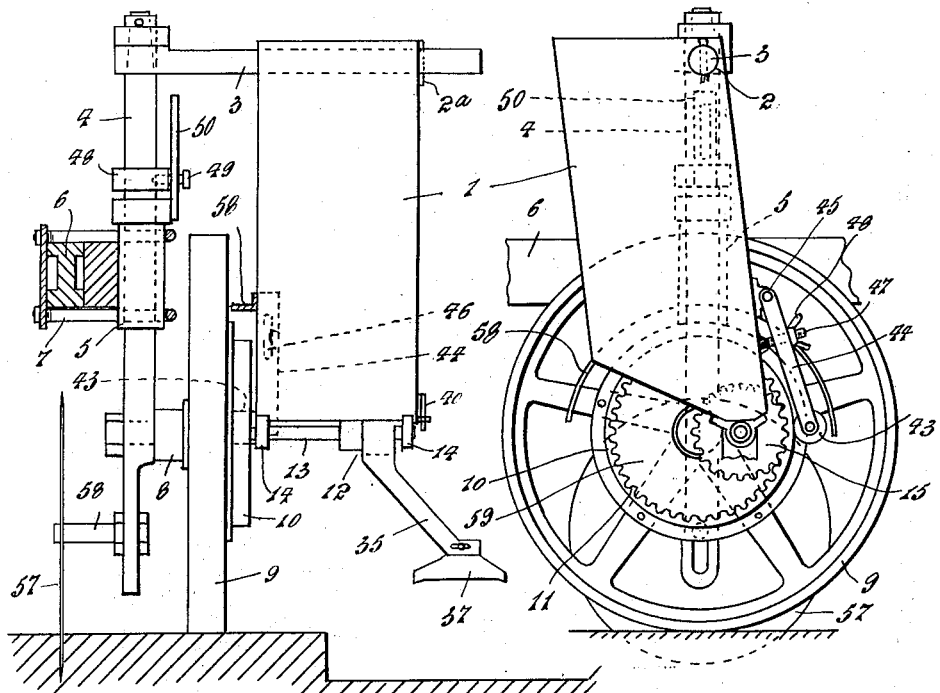

Referring to the drawings, the apparatus consists of a seed box 1 pivoted at its upper end on a transverse bar 3 by means of eyes 2 in the walls of the box and held thereon by a pin 2a. This transverse bar 3 is attached on the upper end of a vertical member 4 slideable through a sleeve 5 fixed upon the beam 6 of a plough by means of couplings, ring bolts or the like 7. The lower end of the member 4 has an axle 8 fixed thereto on which a driving wheel 9 is pivoted. On one side of this driving wheel 9, towards the box, a circumferential flange or rim 10 projects, having internally formed gear teeth 11. At the bottom of the seed box 1 a seed distributor 12 is provided controlling the mouth of the seed box. This distributor has an axle 13 which is journalled in bearings 14 on the bottom wall of the box 1 and extends across the bottom of the box and has fixed upon it a pinion 15 gearing with the teeth 11 of the rim 10. The pinion 15 is retained in mesh with the teeth 11 by the fact that the seed box 1 is pivoted on the bar 3 on one side so that it will swing to a position as shown and enable the pinion 15 to mesh with the teeth 11.

The seed distributor 12 is arranged on the axle 13 and consists of a roller 16 (see Figures 3 and 4) either integral with or fitted to the axle 13 and having a number of slots 17 in its circumferential periphery. A plain division 18 separates the roller 16 from a roller 19 having a single slot 20 containing a slidable part 21 adapted to be adjusted by a wing headed set pin 23 screwed into the spindle 13. The sides of the box converge as shown, so as to leave a slot or opening referenced 25 immediately above the distributor rollers 16 and 19. Converging end walls 28 limit the length of the opening 25 to the combined length of the rollers. The portion of the opening 25 above the roller 16 is adapted to be closed by a slide 26 operable from the exterior of the box by a handle 27. The portion of the opening 25 above the plain roller 19 is not closed by a slide, since when the slidable portion 21 of the roller 19 is in the position shown in Figure 5, the roller 19, even when rotating, retains closed the bottom of the opening 25.

The distributor roller 15 is for the purpose of sowing the smaller kinds of seed, but, when it is not desired to be used, the opening 25 above such roller can be completely closed by the slide 26. In order to regulate the opening, below the edge of the opening 25, a mouth 29 is left between the outer periphery of the roller and the edge of the opening, this space being adjustable by means of a plate 30 which has a slot 31 through which passes a pin having a wing nut thereon so that the plate may be adjusted as desired for different kinds of seeds or the like. The plain roller 19 is for the purpose of sowing larger seed, such as maize or the like, and, when in use, the slidable portion 21 is slid back so as to leave open the slot 20 in such roller which, as it rotates, the seeds from the box will enter the slot 20 and be released.

The slot 20 is shaped as shown in Figure 8, having one radial edge and the other edge sloping outwards in order that the seeds will more easily enter the slot. In order to prevent the seeds becoming broken against the edge of the opening 25, a space 32 is left between the outer periphery of the roller and the opening for the seeds to pass through. A plate 33 on springs 34 fixed at their outer ends to the bottom of the box closes the space 32 and, as the seeds are carried against such plate, it will give and allow the seed to pass undamaged.

Beneath the distributor roller 16, a seed chute 35 is attached to the bottom of the box, as shown in Figures 5 and 6, and extends beneath the roller and is formed into a chute-like portion, leading downwards at a steep angle to a position towards the middle of the furrow, so that seed from the roller will travel along the chute and be deposited onto a spreader 37 attached to one lateral edge 36. The spreader consists of a plate with a convex surface and is adapted to be set to the required angle. The edge 36 is provided with a slot 39 to allow the spreader to be adjusted within a small limit for the better distribution of the seed in relation to the furrow.

In the case of seed falling from the roller 19, it will fall directly into the furrow.

As the plough moves forward, the driving wheel 8 will rotate, consequently rotating the pinion 15 which will rotate the distributor roller 16 releasing the required seed which, falling on to the plate 35, will be directed on to the spreader 37 and distributed evenly in the furrow where it is immediately covered up by the following furrow.

Figures 3, 4:
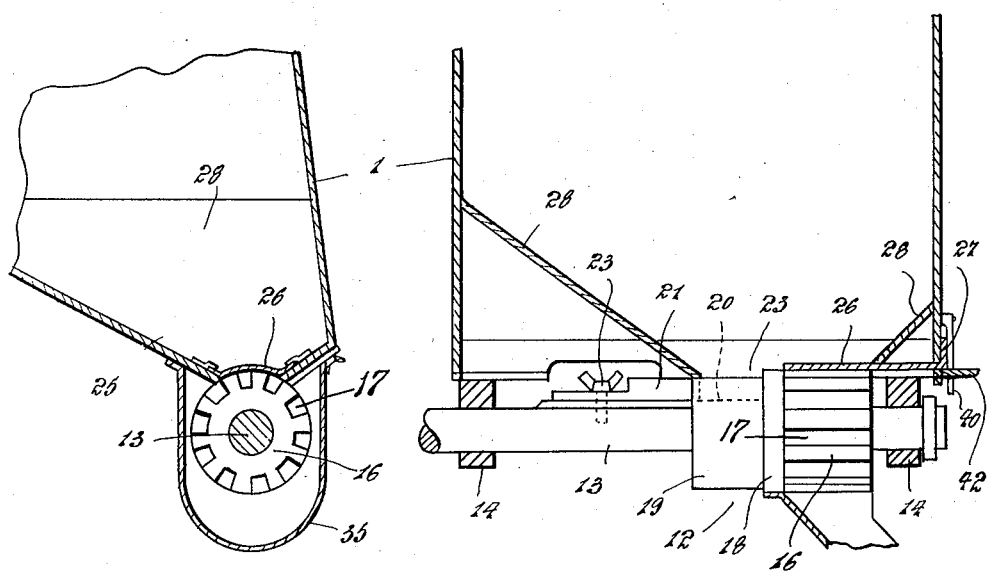
Figure 3 is a cross section through the seed box and the distributor roller.
Figure 4 is a longitudinal section through the seed box.

The slide 26 may be withdrawn to any desired position in order to regulate the amount of seed passing to the roller 16 and is held in such position by means of a catch 40 pivoted above the slide and having one leg 41 to bear on the upper side of the slide by the weight of the longer leg 40 and depress the side against the bracket 42, thus retaining the plate in position. When the slide is completely in, as shown in Figure 4, the leg 41 passes behind the handle of the slide, as shown, and retains it in its closed position.

A roller 43 (see Figures 1 and 2) is pivoted at the end of an arm 44 hinged to the box at 45 and has a slot 46 through which passes a pin 47 having a wing nut 48. The roller runs upon the machined periphery of the flange 10 and prevents the gear wheel 9 becoming out of mesh with the teeth 11, particularly so on rough ground.

The member 4 passes through the sleeve 5 which, as above pointed out, is attached to the beam of a plough and has upon it a collar 48 adjustable by means of a set pin 49 over which passes a slotted bar 50 fixed to the sleeve 5. This allows for unevenness of the ground so that the wheel will continue to rotate, but, when the plough rises to the upper surface of the ground, the member 4 only falls a distance limited by the bar 50 on the pin, so that the wheel is then clear of the ground and the distributor on the box no longer rotates. Thus, the box is put into gear automatically with the plough entering the ground.

A coulter 57 is pivoted on a spindle 58 projecting from the vertical member 4 and is set centrally with the beam of the plough as shown in Figure 7.

In the case of a smaller box being used, the rollers of the distributor are removable and interchangeable so that either roller 16 or 19 can be used on the one spindle, one being removed and the other placed in the same position.

It is obvious that the invention may be used with single or multiple furrows ploughs.

A mud guard 58 is attached to the box over the rim 11 to prevent earth adhering to the rim over which the roller 43 works and also into the interior gear 11.

A plate 59 closes the opening of the wheel 9 within the opening of the rim 10.

By using different sized pinions 15, different speeds of distributing rollers may be obtained.

What I claim is:—

1. A seed and the like distributor for attachment to a plough comprising a member vertically slidable on the beam of the plough, a seed box pivoted at its upper end upon said member, an axle traversing the bottom of said box, seed distributing means controlling the lower end of said box and mounted upon said axle, a driving wheel mounted upon said adjustable member, a concentric toothed rim on said driving wheel, and a pinion on the end of said axle adapted to engage said rim on said driving wheel and said seed box being pivoted in such a position on said member in respect to the gravity axis that the said pinion will be urged into mesh with said rim.

2. A seed and the like distributor for attachment to ploughs, comprising a member vertically slidable upon the beam of the plough, a seed box pivoted at its upper end to the upper end of said member, a driving wheel pivoted upon the lower end of said member, a concentric rim on said driving wheel having internal teeth, an axle traversing the bottom of said seed box, distributing means mounted on said axle and controlling the mouth of said seed box, and a toothed pinion on the end of said axle normally tending to mesh with the rim by reason of the position of the pivoting of the seed box in respect to the gravity axis thereof to urge the said pinion into mesh with the said rim.

3. In the distributor as claimed in claim 2, a sleeve mounted on the beam of said plough, said vertical member slidable through said sleeve, means to limit the downward movement of said sliding member within said sleeve so that when the plough is running on the surface of the ground said driving wheel is clear of the ground whereby it no longer rotates.

4. In a device as claimed in claim 2, a bar hinged to the seed box, a roller pivoted on said bar adapted to run upon the outer periphery of said concentric rim, a pin from the seed box projecting through a slot in said bar, and a wing nut on said pin for regulating said roller against said rim.

5. A seed and the like distributor for attachment to ploughs, comprising a member vertically slidable upon the beam of the plough, a seed box having a slotted opening in its lower end pivoted at its upper end in said member, a driving wheel pivoted upon the lower end of said member, a concentric rim on said driving wheel having internal teeth, an axle traversing the bottom of said seed box, a pinion on the end of said axle to engage said rim, and retained in mesh therewith by reason of the position of the pivoting of the box in respect of the gravity axis thereof urging said pinion into mesh with said rim, a distributor roller mounted on said axle beneath such opening, and means to regulate the opening above the said roller, and means to adjust the space between the periphery of said roller and one end of the opening.

6. A seed and the like distributor for attachment to ploughs comprising a member vertically slidable upon the beam of a plough, a seed box pivoted at its upper end in said member, a driving wheel pivoted upon the lower end of said member, a concentric rim on said driving wheel having internal teeth, an axle traversing the bottom of said seed box, distributing means carried by said axle and fitting the bottom of the said seed box, and a toothed pinion on the end of said axle normally tending to mesh with the rim by reason of the position of the pivoting of said seed box in respect to the gravity axis thereof urging the said pinion into mesh with said rim, a seed chute arranged beneath said distributing means and depending downwards and outwards whereby the seed after leaving the distributor will be directed towards the furrow.

In testimony whereof, I have signed my name to this specification.

WILLIAM HENRY BARBER.